(12) United States Patent
Yamasaki et al.

(10) Patent No.: US 10,341,179 B2
(45) Date of Patent: Jul. 2, 2019

(54) MANAGEMENT COMPUTER AND COMPUTER SYSTEM MANAGEMENT METHOD

(71) Applicant: HITACHI, LTD., Tokyo (JP)

(72) Inventors: Kenta Yamasaki, Tokyo (JP); Takashi Tameshige, Tokyo (JP); Takeshi Termamura, Tokyo (JP); Yutaka Kudou, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 409 days.

(21) Appl. No.: 15/327,559

(22) PCT Filed: Mar. 18, 2015

(86) PCT No.: PCT/JP2015/058094
§ 371 (c)(1),
(2) Date: Jan. 19, 2017

(87) PCT Pub. No.: WO2016/147348
PCT Pub. Date: Sep. 22, 2016

(65) Prior Publication Data
US 2018/0219733 A1    Aug. 2, 2018

(51) Int. Cl.
*H04L 12/24* (2006.01)
*G06F 9/50* (2006.01)

(52) U.S. Cl.
CPC ............ *H04L 41/0816* (2013.01); *G06F 9/50* (2013.01); *G06F 9/5077* (2013.01); *H04L 41/12* (2013.01); *H04L 41/50* (2013.01)

(58) Field of Classification Search
CPC ..... H04L 41/0816; H04L 41/12; H04L 41/50; G06F 9/50; G06F 9/5077
See application file for complete search history.

(56) References Cited

U.S. PATENT DOCUMENTS

| 2013/0054776 | A1 | 2/2013 | Kunze et al. |
| 2013/0091285 | A1* | 4/2013 | Devarakonda ........ G06F 9/4856 709/226 |
| 2014/0280437 | A1 | 9/2014 | Eder |
| 2015/0242197 | A1* | 8/2015 | Alfonso .................... G06F 8/65 717/173 |

FOREIGN PATENT DOCUMENTS

| CN | 102571948 A * | 7/2012 | ............. H04L 29/08 |
| JP | 5543653 B2 | 7/2014 | |
| JP | 2014-532247 A | 12/2014 | |

* cited by examiner

*Primary Examiner* — Wing F Chan
*Assistant Examiner* — Billy H Ng
(74) *Attorney, Agent, or Firm* — Volpe and Koenig, P.C.

(57) ABSTRACT

A management computer manages first XaaS including a first node configuration and second XaaS including a second node configuration that is dependent on resources provided by the first XaaS. When a required resource amount which is required for the first XaaS in order to change the second node configuration is larger than a resource amount which can be provided by the first XaaS, the management computer determines a changed first node configuration which is capable of providing a resource amount equal to or larger than the required resource amount and, after changing the first XaaS to the determined changed first node configuration, changes the second node configuration of the second XaaS.

12 Claims, 11 Drawing Sheets

Fig. 3

| Configuration information of PaaS ||
|---|---|
| Number of PFs | PaaS configuration name |
| 0 to 100 | PaaS configuration A |
| 101 to 200 | PaaS configuration B |
| 201 to 300 | PaaS configuration C |
| ... | ... |

Fig. 4

| Configuration option information of PaaS | | | | |
|---|---|---|---|---|
| Type | PaaS configuration A | PaaS configuration B | PaaS configuration C | ... |
| Execution node | 2 | 3 | 4 | ... |
| Routing node | 1 | 1 | 2 | ... |
| API node | 1 | 1 | 1 | ... |
| Log management node | 1 | 2 | 2 | ... |
| ... | ... | ... | ... | ... |

Fig. 5

| Configuration information of IaaS | |
|---|---|
| Number of VMs | IaaS configuration name |
| 0 to 30 | IaaS configuration A |
| 31 to 50 | IaaS configuration B |
| 51 to 70 | IaaS configuration C |
| ... | ... |

Fig. 6

| Type | IaaS configuration A | IaaS configuration B | IaaS configuration C | ... |
|---|---|---|---|---|
| Calculation node | 1 | 2 | 4 | ... |
| Storage node | 1 | 2 | 2 | ... |
| Authentication node | 1 | 1 | 1 | ... |
| Network node | 1 | 2 | 2 | ... |
| ... | ... | ... | ... | ... |

Configuration option information of IaaS

Fig. 7

| Operation information of PaaS ||||  |
|---|---|---|---|---|
| Number of PFs | HA configuration | Monitoring configuration | Backup configuration | ... |
| 0 to 50 | PaaS operation A | PaaS operation A | PaaS operation A | ... |
| 51 to 80 | PaaS operation A | PaaS operation A | PaaS operation B | ... |
| 81 to 200 | PaaS operation B | PaaS operation B | PaaS operation C | ... |
| ... | ... | ... | ... | ... |

Fig. 8

| Type | PaaS operation A | PaaS operation B | PaaS operation C | ... |
|---|---|---|---|---|
| HA configuration | Disabled | Enabled | Enabled | ... |
| Monitoring configuration | 10 minutes | 5 minutes | 1 minute | ... |
| Backup configuration | Weekly | Daily | Hourly | ... |
| ... | ... | ... | ... | ... |

Operation option information of PaaS — 330
332 — Type column
334 — PaaS operation columns

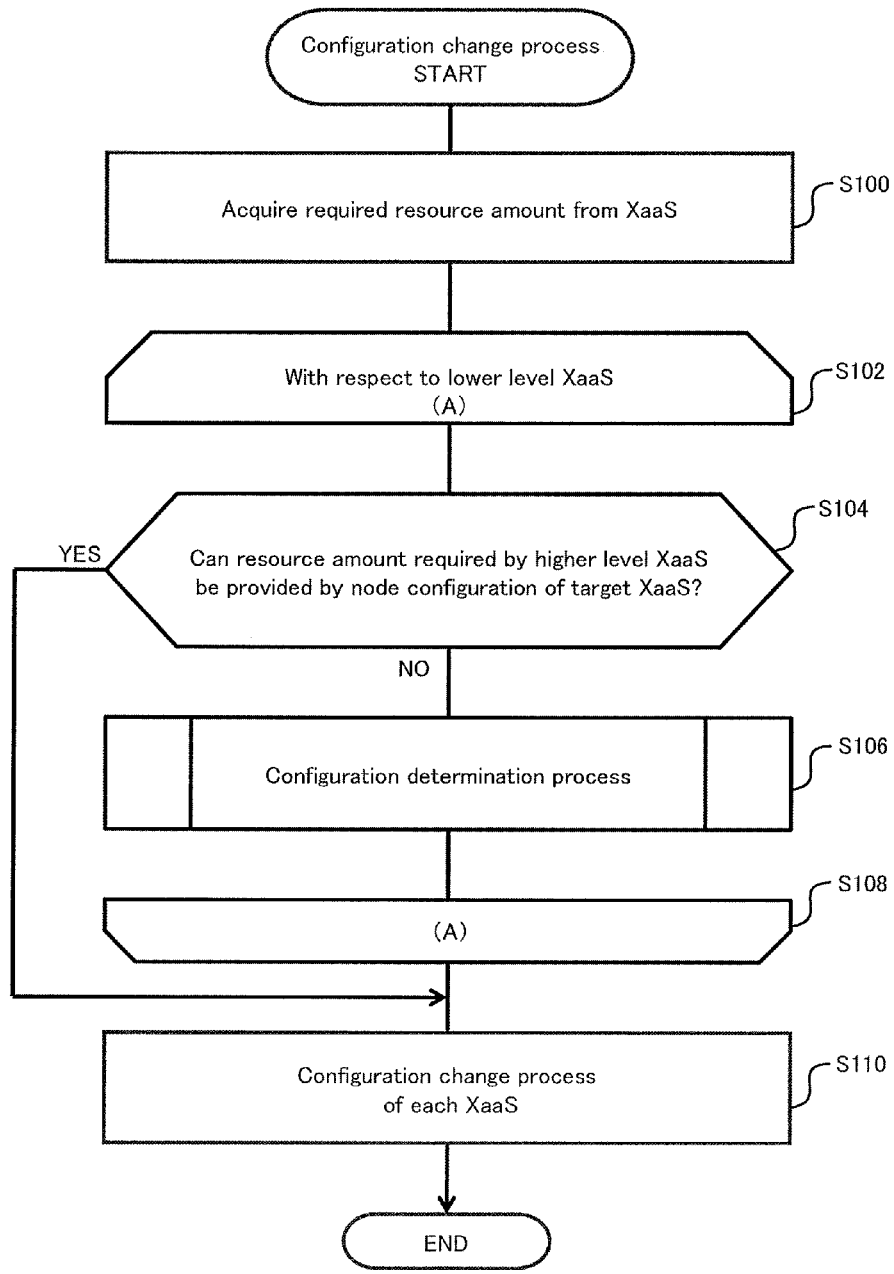

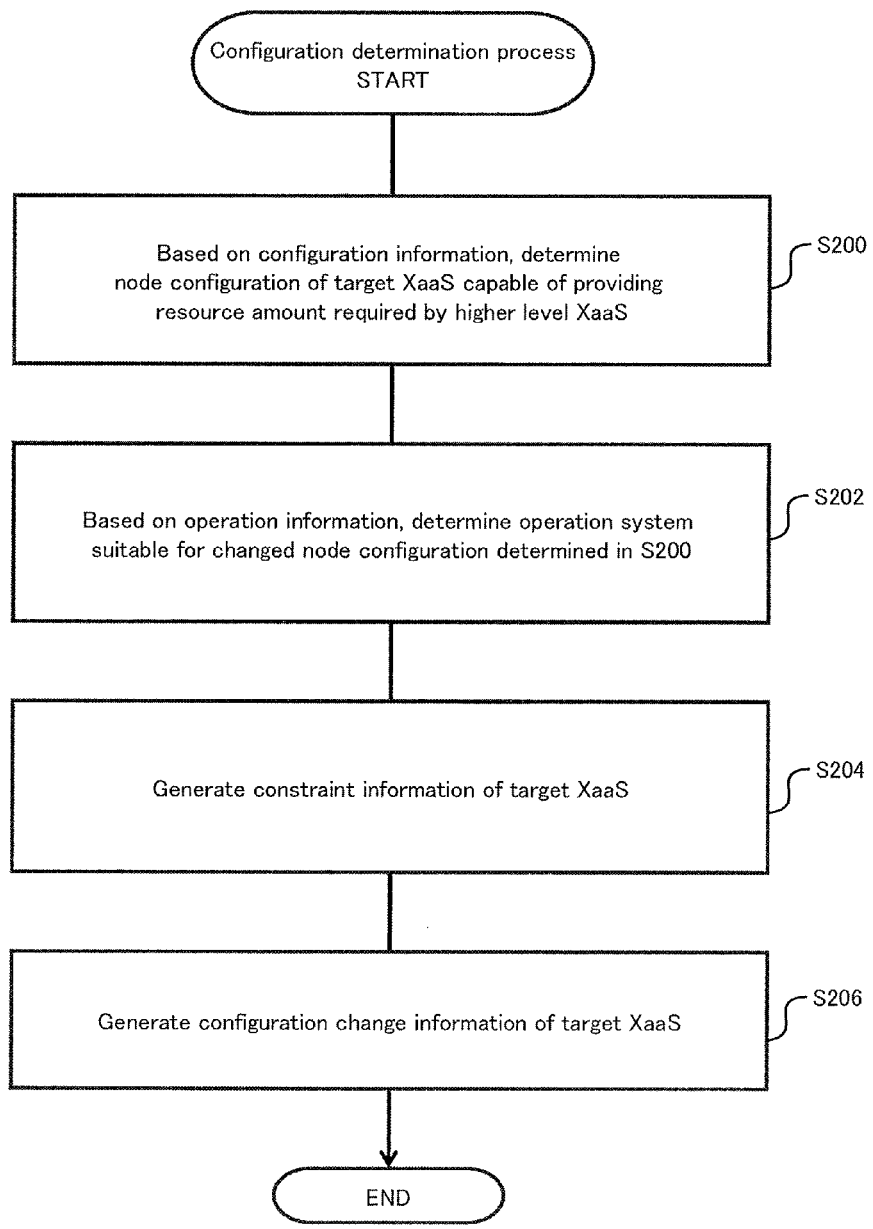

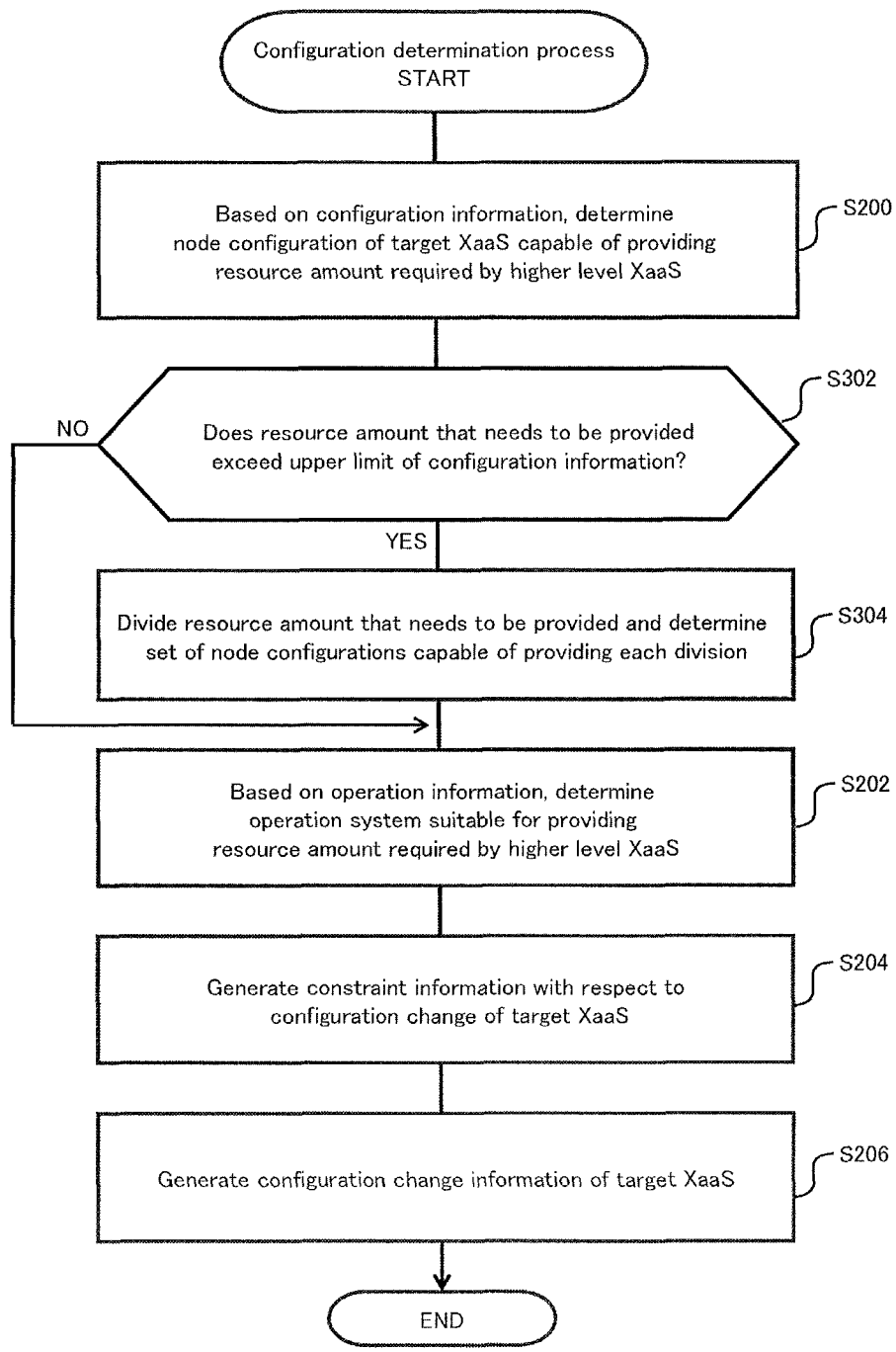

MANAGEMENT COMPUTER AND COMPUTER SYSTEM MANAGEMENT METHOD

TECHNICAL FIELD

The present invention generally relates to a technique relating to a management computer and a computer system management method.

BACKGROUND ART

Cloud computing in which computer resources are utilized through a network is known. XaaS (X as a Service) is known as a term for classifying cloud computing. Generally, XaaS refers to services which enable resources (for example, hardware, a line, a software execution environment, application software, and a development environment) necessary for constructing or operating an information system to be utilized through a network. A character (or word) adopted as "X" in XaaS differs depending on a type (a service model) of XaaS or, in other words, a type of resource provided to a user. Examples of XaaS include SaaS (Software as a Service), PaaS (Platform as a Service), IaaS (Infrastructure as a Service), and HaaS (Hardware as a Service).

As a technique related to cloud computing, there is a technique in which a processing device related to PaaS receives a message indicating a resource state related to a resource of IaaS and, based on the received message, determines a resource of IaaS for instantiating a platform service of PaaS (PTL 1).

An integrated apparatus includes a computer, a storage apparatus, and a coupling apparatus, coupleability of which is guaranteed in advance, and there is a technique which enables an integrated apparatus to be automatically selected in a computer system including integrated apparatuses (PTL 2).

CITATION LIST

Patent Literature

[PTL 1]
US 2014/0280437
[PTL 2]
Japanese Patent No. 5543653

SUMMARY OF INVENTION

Technical Problem

IaaS includes a node constructed on a physical machine. The IaaS provides a virtual machine (hereinafter, referred to as a "VM") using the node. PaaS includes a node constructed on a VM. The PaaS provides a platform (hereinafter, referred to as a "PF") using the node. SaaS includes a node constructed on a PF. The SaaS provides an application (hereinafter, referred to as an "AP") using the node. Such a relationship is called XaaS in a hierarchical relationship.

When adding a node to the SaaS, there may be cases where the PaaS requires a new PF. This may require a node to be added to the PaaS. However, simply adding a node to be used as a new PF to the PaaS may cause a problem at the PaaS. For example, due to the increase in nodes of the PaaS, management of the nodes of the PaaS may no longer be performed in a sufficient manner. In other words, it is difficult to appropriately increase or reduce nodes of XaaS in XaaS in a hierarchical relationship.

Solution to Problem

A management computer according to an embodiment of the present invention includes: an interface device coupled to a computer system; and a processor. The processor manages a plurality of XaaS (X as a Service) which are based on the computer system and which include first XaaS including first node configurations and second XaaS including second node configurations that are dependent on resources provided by the first XaaS. In addition, when a required resource amount which is required for the first XaaS in order to change the second node configurations is larger than a resource amount which can be provided by the first XaaS, the processor determines a changed first node configuration which enables providing a resource amount equal to or larger than the required resource amount and, after changing the first XaaS to the determined changed first node configuration, changes the second node configurations of the second XaaS.

Advantageous Effects of Invention

Nodes of XaaS in XaaS in a hierarchical relationship can be appropriately changed.

BRIEF DESCRIPTION OF DRAWINGS

FIG. 3 shows an example of configuration information of PaaS.
FIG. 4 shows an example of configuration option information of PaaS.
FIG. 5 shows an example of configuration information of IaaS.
FIG. 6 shows an example of configuration option information of IaaS.
FIG. 7 shows an example of operation information of PaaS.
FIG. 8 shows an example of operation option information of PaaS.
FIG. 9 is a flow chart showing an example of a configuration change process.
FIG. 10 is a flow chart showing an example of a configuration determination process.
FIG. 11 is a flow chart showing a modification of a configuration determination process.

DESCRIPTION OF EMBODIMENTS

Hereinafter, an embodiment will be described. In the following description, while a computer program (hereinafter, referred to as a "program") is sometimes used as a subject when describing a process, since a program causes prescribed processing to be performed while using at least one of a storage resource (for example, a memory) and a communication interface device as appropriate by being executed by a processor (for example, a CPU (central processing unit)), a processor or an apparatus including the processor may be used as a subject of processing. Processing performed by a processor may be partially or entirely performed by a hardware circuit. A program may be installed from a program source. The program source may be a program distribution server or a storage medium (for example, a portable storage medium). Furthermore, in the following description, a set of one or more computers which manage at least one apparatus included in a computer system may be referred to as a "management system". When a management computer displays display information, the management computer may constitute a management system. In addition, a combination of a management computer and a display computer may also constitute a management system. Furthermore, processes identical or similar to those of a management computer may be realized by a plurality of computers in order to increase speed or reliability of a management process. In this case, the plurality of computers may constitute a management system (when a display computer performs display, the display computer may also be included). In the present embodiment, a management computer constitutes a management system. Moreover, a management computer displaying information may signify displaying information on a display device included in the management computer or transmitting display information to a display computer (for example, a client) being coupled to the management computer (for example, a server). In the case of the latter, information representing display information is displayed by the display computer on the display device included in the display computer. Furthermore, in the following description, when describing elements of a same type while distinguishing the elements from one another, reference signs such as "xxx 20a" and "xxx 20b" will be used. However, when describing elements of a same type without distinguishing the elements from one another, only a shared number among the reference signs such as "xxx 20" may be used.

Figure 1:
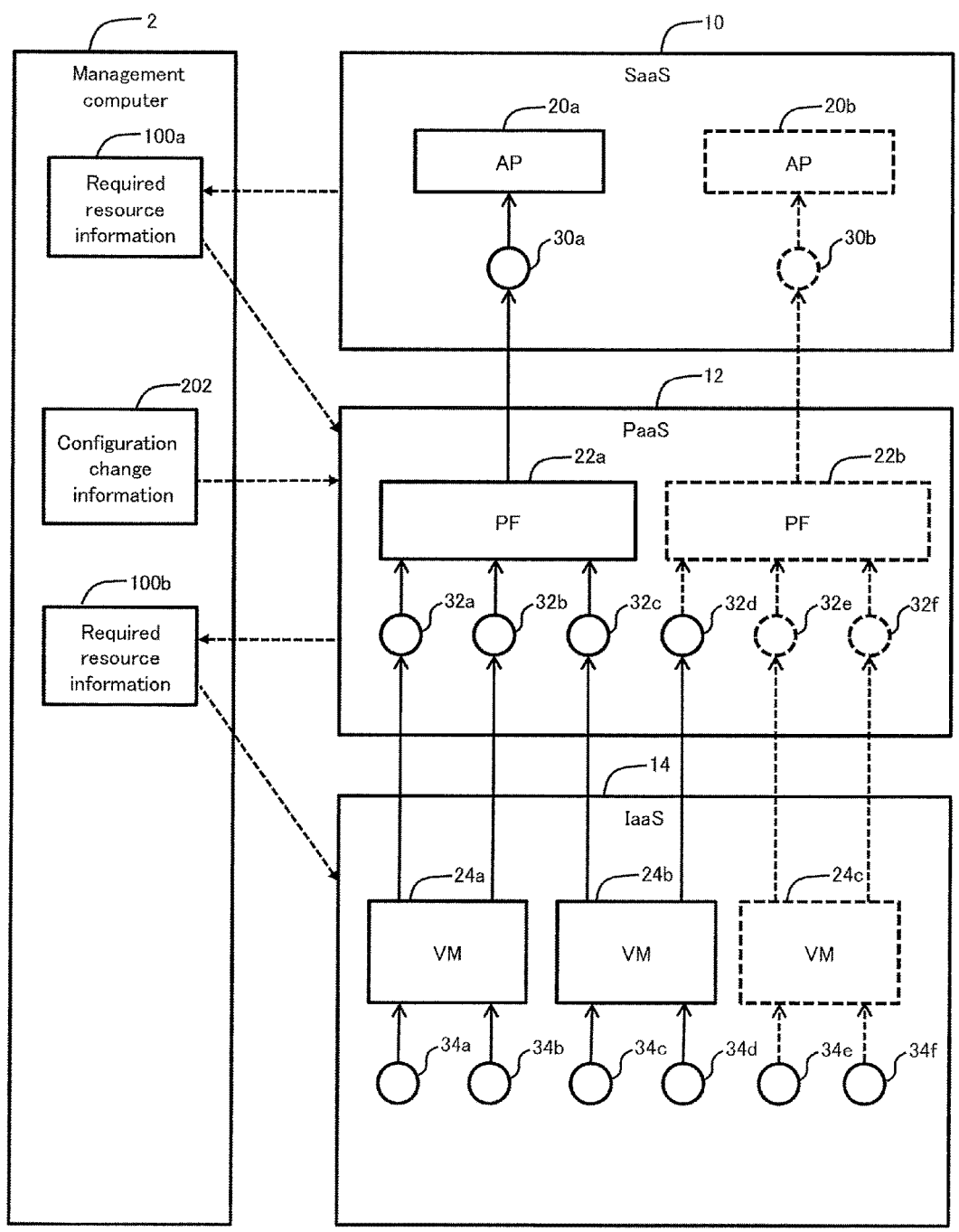
FIG. 1 shows an outline of operations of a management computer according to an embodiment.

FIG. 1 shows an outline of operations of a management computer 2 according to an embodiment.

The management computer 2 manages XaaS which is a mode of cloud computing. The XaaS provides a user (not limited to people and may be another computer, a program, or the like) with a resource. The resource is realized by a node included in the XaaS. Modes of the XaaS include IaaS 14, PaaS 12, and SaaS 10.

The IaaS 14 provides a virtual machine (hereinafter, referred to as a "VM") 24 as a resource. The VM 24 is realized (instantiated) by a node 34 included in the IaaS 14. Examples of types of the node 34 include a calculation node which performs calculations, a storage node which stores data, an authentication node which performs authentication, and a network node which performs communication. The node 34 may be constructed on a physical machine. A plurality of nodes 34 may be constructed on a single physical machine.

The PaaS 12 provides a platform (hereinafter, referred to as a "PF") 22 for developing or executing an application as a resource. The PF 22 is realized by a node 32 included in the PaaS 12. Examples of types of the node 32 include an execution node which executes an application, a routing node which routes data, an API node which provides an API (Application Programming Interface), and a log management node which manages a log. The API node may provide middleware or the like. The node 32 may be constructed on the VM 24 provided by the IaaS 14. A plurality of nodes 32 may be constructed on a single VM 24. In this case, the PaaS 12 is described as being on a higher level with respect to the IaaS 14 and the IaaS 14 is described as being on a lower level with respect to the PaaS 12.

The SaaS 10 provides an application (hereinafter, referred to as an "AP") 20 as a resource. The AP 20 is realized by a node 30 included in the SaaS 10. The node 30 may be constructed on the PF 22 provided by the PaaS 12. A plurality of nodes 30 may be constructed on a single PF 22. In this case, the SaaS 10 is described as being on a higher level with respect to the PaaS 12 and the PaaS 12 is described as being on a lower level with respect to the SaaS 10.

Next, an example of increasing the number of APs 20 that can be provided by the SaaS 10 will be described with reference to FIG. 1. This example is premised on the following. In the IaaS 14, "one" VM 24 can be realized by "two" nodes 34. "Two" nodes 32 of the PaaS 12 can be constructed on "one" VM 24. In the PaaS 12, "one" PF 22 can be realized by "two" nodes 32. "One" node 30 of the SaaS 10 can be constructed on "one" PF 22. In the SaaS 10, "one" AP 20 can be realized by "one" node 30. In addition, in the PaaS 12, "one" FP 22 can be managed by "one" node 32.

The SaaS 10 determines to add "one" node 30 so that "one" AP 20 can be increased. In order to add "one" node 30 to the SaaS 10, "one" PF 22 is required at the PaaS 12. In consideration thereof, the SaaS 10 generates required resource information 100a which is used to request "one" (resource amount) PF 22 (resource) to the PaaS 12. A similar description applies to required resource information 100b. A resource amount that is requested using required resource information 100 is referred to as a required resource amount. In other words, a required resource amount is a resource amount requested by XaaS that is a target of a configuration change to lower level XaaS in order to realize the configuration change. The required resource information 100 may be generated by the management computer 2.

The management computer 2 determines whether or not the "one" PF 22 requested using the required resource information 100a can be provided according to a current node configuration (for example, the number of nodes 32) of the PaaS 12. In the case of FIG. 1, although a node 32d is available (a node 32c is used for managing the PF 22a and is therefore not available), "one" PF 22b cannot be added by the node 32d alone. Therefore, a result of this determination is "negative". In consideration thereof, the management computer 2 determines to add "two" nodes 32e and 30f to the PaaS 12 and generates configuration change information 202 of the PaaS 12 including contents of the determination.

In order to add "two" nodes 32e and 32f to the PaaS 12, "one" VM 24 is required at the IaaS 14. In consideration thereof, the management computer 2 generates required resource information 100b which is used to request "one" VM 24 to the IaaS 14.

The management computer 2 determines whether or not the "one" VM 24 requested using the required resource information 100b can be provided according to a current node configuration (for example, the number of nodes 34) of the IaaS 14. In the case of FIG. 1, since nodes 34e and 34f are available, "one" VM 24c can be added. Therefore, a result of this determination is "positive". In consideration thereof, the management computer 2 issues an indication to the IaaS 14 to realize (instantiate) the VM 24c using the nodes 34e and 34f.

After the VM 24c is realized at the IaaS 14, based on configuration change information 202 of the PaaS 12, the management computer 2 issues an indication to the PaaS 12 to construct nodes 32e and 32f on the VM 24c. In addition, the management computer 2 issues an indication to the PaaS 12 to realize (instantiate) a PF 22b using the nodes 32e and 32f.

After the PF 22*b* is realized at the PaaS 12, the management computer 2 issues an indication to the SaaS 10 to construct a node 30*b* on the PF 22*b*. In addition, the management computer 2 issues an indication to the SaaS 10 to realize an AP 20*b* using the node 30*b*.

A change in node configuration is not limited to an increase in the number of nodes and may also signify a reduction in the number of nodes. In addition, depending on a type of resource, a node of a different type may become necessary in order to realize (instantiate) the resource. For example, there may be cases where a calculation node and a storage node are necessary to realize the VM 24. A change in node configuration is not limited to an increase or a reduction in the number of one type of node and may also signify an increase or a reduction in respective numbers of different types of nodes.

As described above, the management computer 2 sequentially determines contents of a change in a node configuration of XaaS from a higher tier toward a lower tier and, after determining all change contents, sequentially changes the node configuration of the XaaS from the lower tier toward the higher tier. Accordingly, node configurations of XaaS in XaaS in a hierarchical relationship can be appropriately changed.

Figure 2:
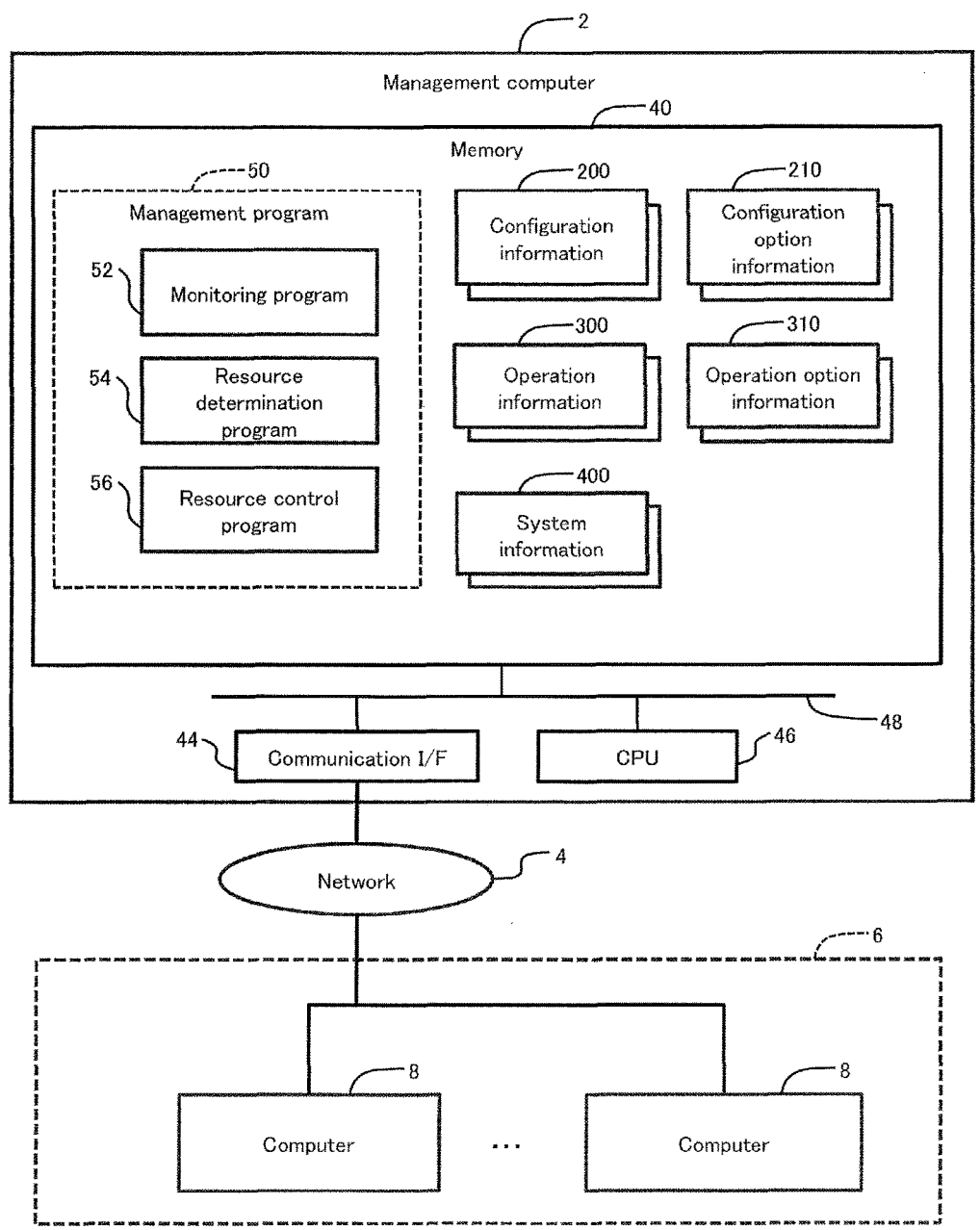
FIG. 2 shows configuration examples of a management computer and a computer system.

FIG. 2 shows configuration examples of the management computer 2 and a computer system 6.

The computer system 6 includes a plurality of computers 8. The management computer 2 manages the plurality of computers 8 or, in other words, manages the computer system 6. The plurality of computers 8 and the management computer 2 are capable of two-way data communication via a network 4. XaaS is provided based on resources of the plurality of computers 8. In other words, the management computer 2 manages the XaaS.

The management computer 21 includes a CPU 46, a memory 40, and a communication I/F (interface) 44. These elements 40, 44, and 46 are coupled by an internal bus 48 which enables two-way data communication.

The communication I/F 44 is an I/F for coupling the management computer 2 to the network 4. Examples of the communication I/F 44 include an Ethernet (registered trademark) adapter and a Fibre Channel adapter. Examples of the network 4 include a LAN (local area network), a WAN (wide area network), and a VPN (virtual private network).

The memory 40 stores a management program 50 for managing the XaaS. A memory 12 stores configuration information 200 including information related to a configuration of the XaaS, configuration option information 210 that is attached to the configuration information 200, operation information 300 including information related to an operation of the XaaS, operation option information 310 that is attached to the operation information 300, and system information 400 including information indicating a state of the XaaS. Examples of the memory 12 include a DRAM (dynamic random access memory), an MRAM (magnetoresistive random access memory), and an FeRAM (ferroelectric random access memory).

The management program 50 is executed by a CPU (central processing unit) 11 and realizes functions included in the management computer 2. The management program 50 includes a monitoring program 52, a resource determination program 54, and a resource control program 56. In other words, by having the CPU 11 execute the monitoring program 52, the resource determination program 54, and the resource control program 56, the management computer 2 can have a management unit, a resource determination unit, and a resource control unit.

The monitoring program 52 acquires a current node configuration, node usage, and the like at prescribed intervals from the XaaS (or receives information appropriately notified by the XaaS), and stores acquired contents in the system information 400.

The resource determination program 54 determines a node configuration of the XaaS. A case where first XaaS includes a first node configuration, second XaaS includes a second node configuration that is dependent on a resource provided by the first XaaS, and the second node configuration of the second XaaS is to be changed will now be described. In this case, the resource determination program 54 determines whether or not a required resource amount that is required for the first XaaS in order to change the second node configuration is larger than a resource amount that can be provided by the first XaaS. When a result of the determination is positive, the resource determination program 54 determines a changed first node configuration which enables providing a resource amount equal to or larger than the required resource amount. When a result of the determination is negative, there is no need for the resource determination program 54 to change the first node configuration. In this case, the first XaaS may be the IaaS 14 and the second XaaS may be the PaaS 12. Alternatively, the first XaaS may be the PaaS 12 and the second XaaS may be the SaaS 10.

Types of the node 34 of the IaaS 14 may include a node 34 used to configure a VM 24 and a node 34 used to manage the VM 24. The resource amount that can be provided according to a node configuration of the IaaS 14 may be an amount in accordance with the number of the nodes 34 that can be used to configure the VM 24. The nodes 34 that can be used to configure the VM 24 may include a calculation node, a storage node, an authentication node, and a network node. A required resource amount with respect to the IaaS 14 may be an amount in accordance with the number of VMs 24 that is requested to the IaaS 14. The nodes 34 of the IaaS 14 may be constructed on the computer 4.

Types of the node 32 of the PaaS 12 may include a node 32 used to configure a PF 22 and a node 32 used to manage the PF 22. The resource amount that can be provided according to a node configuration of the PaaS 12 may be an amount in accordance with the number of the nodes 32 that can be used to configure the PF 22. The nodes 32 that can be used to configure the PF 22 may include an execution node, a routing node, and an API node. A required resource amount with respect to the PaaS 12 may be an amount in accordance with the number of PFs 22 that is requested to the PaaS 12. The nodes 32 of the PaaS 12 may be constructed on the VM 24 of the IaaS 14.

Types of the node 30 of the SaaS 10 may include a node 30 used to configure an AP 20 and a node 30 used to manage the AP 20. The nodes 30 of the SaaS 10 may be constructed on the PF 22 of the PaaS 12.

The resource control program 56 changes each XaaS to the node configuration determined by the resource determination program 54 in sequence from a lower level to a higher level. For example, when a result of the determination by the resource determination program 54 described above is positive, the resource control program 56 changes the first XaaS to the changed first node configuration determined by the resource determination program 54 and subsequently changes the second node configuration of the second XaaS. Configuration information of each tier may be generated by the resource determination program 54. The resource control program 56 may change node configurations from lowermost XaaS requiring a change in its node configuration toward XaaS of higher levels.

In configuration information 200 related to the XaaS, a resource amount provided by the XaaS may be associated with a node configuration which enables providing the resource amount. In addition, the resource determination program 54 may select a changed node configuration which enables providing a resource amount equal to or larger than a required resource amount from the node configuration included in the configuration information 200 related to the XaaS. Details of the configuration information 200 will be provided later.

In operation information 300 related to the XaaS, a resource amount provided by the XaaS may be associated with an operation system of the XaaS which enables providing (is suitable for providing) the resource amount. In addition, the resource determination program 54 may select an operation system of the first XaaS which enables providing a resource amount equal to or larger than a required resource amount from the node configurations included in the operation system of the XaaS. In this case, when changing the node configuration of the XaaS, the resource control program 56 may change the operation system of the XaaS to the selected operation system. Details of the operation information 300 will be provided later.

FIGS. 3 to 6 show examples of the configuration information 200 and the configuration option information 210 of each XaaS.

FIG. 3 shows an example of the configuration information 220 of PaaS.

The configuration information 220 of PaaS includes the number of PFs 222 and a PaaS configuration name 224 as fields.

The number of PFs 222 stores the number or a range of numbers of PFs 22 which the PaaS 12 can provide.

The PaaS configuration name 224 stores a name (or an ID) of a node configuration, a capacity of which to enable the provision of at least the number or the range of numbers of PFs 22 stored in the number of PFs 222 is verified (guaranteed) by a vendor of the PaaS 12 or the like.

FIG. 3 shows that, by configuring nodes of the PaaS 12 in accordance with a "PaaS configuration B", at least "101 to 200" PFs 222 can be provided. In other words, FIG. 3 shows that in order to provide "101 to 200" PFs 222, nodes with the "PaaS configuration B" must be configured in the PaaS 12. A similar description also applies to a "PaaS configuration A" and a "PaaS configuration C".

FIG. 4 shows an example of the configuration option information 230 of PaaS.

The configuration option information 230 of PaaS includes a breakdown of each PaaS configuration 234. The breakdown of the PaaS configuration 234 may be a node type 232 and the number of nodes of the type 232. Examples of the node type 232 of the PaaS may include an execution node, a routing node, an API node, and a log management node.

For example, FIG. 4 shows that the "PaaS configuration B" includes "three" execution nodes, "one" routing node, "one" API node, and "one" log management node. A similar description also applies to the "PaaS configuration A" and the "PaaS configuration C". Therefore, FIGS. 3 and 4 show that, in order to provide "101 to 200" PFs 222, "three" execution nodes, "one" routing node, "one" API node, and "two" log management nodes must be configured in the PaaS 12 as indicated by the "PaaS configuration B".

FIG. 5 shows an example of the configuration information 240 of IaaS.

The configuration information 240 of IaaS includes the number of VMs 242 and an IaaS configuration name 244 as fields.

The number of VMs 242 stores the number or a range of numbers of VMs 24 which the IaaS 14 can provide.

The IaaS configuration name 244 stores a name (or an ID) of a node configuration, a capacity of which to enable the provision of at least the number or the range of numbers of VMs 24 stored in the number of VMs 242 is verified (guaranteed) by a vendor of the IaaS 14 or the like.

For example, FIG. 5 shows that, by configuring nodes of the IaaS 14 in accordance with an "IaaS configuration B", at least "31 to 50" VMs 242 can be provided. In other words, FIG. 5 shows that in order to provide "31 to 50" VMs 242, nodes with the "IaaS configuration B" must be configured in the IaaS 14. A similar description also applies to an "IaaS configuration A" and an "IaaS configuration B".

FIG. 6 shows an example of the configuration option information 250 of IaaS.

The configuration option information 250 of IaaS includes a breakdown of each IaaS configuration 254. The breakdown of IaaS configuration may be a node type 252 and the number of nodes of the type 252. Examples of the node type 252 of IaaS may include a calculation node, a storage node, an authentication node, and a network node.

For example, FIG. 6 shows that the "IaaS configuration B" includes "two" calculation nodes, "two" storage nodes, "one" authentication node, and "two" network nodes. A similar description also applies to the "IaaS configuration A" and the "IaaS configuration C". Therefore, FIGS. 5 and 6 show that, in order to provide "31 to 50" VMs 242, "two" calculation nodes, "two" storage nodes, "one" authentication node, and "two" network nodes must be configured in the IaaS 14 as indicated by the "IaaS configuration B".

FIGS. 7 and 8 show examples of the operation information 300 and the operation option information 310 of each XaaS.

FIG. 7 shows an example of the operation information 320 of PaaS.

The operation information 320 of PaaS includes the number of PFs 322 and an operation type as fields. The operation type of PaaS may include an HA configuration 324, a monitoring configuration 326, and a backup configuration 328.

The number of PFs 322 is as described with reference to FIG. 3.

The HA configuration 324 stores an HA operation system, a capacity of which to enable the operation of (suitability to operate) at least the number or the range of numbers of PFs 22 stored in the number of PFs 322 is verified (guaranteed) by a vendor of the PaaS 12 or the like.

The monitoring configuration 326 stores a monitoring operation system, a capacity of which to enable the operation of (suitability to operate) at least the number or the range of numbers of PFs 22 stored in the number of PFs 322 is verified (guaranteed) by a vendor of the PaaS 12 or the like.

The backup configuration 328 stores a backup operation system, a capacity of which to enable the operation of (suitability to operate) at least the number or the range of numbers of PFs 22 stored in the number of PFs 322 is verified (guaranteed) by a vendor of the PaaS 12 or the like.

For example, FIG. 7 shows that, by operating the PaaS 12 with a "PaaS operation A" for the HA configuration 324, the "PaaS operation A" for the monitoring configuration 326, and a "PaaS operation B" for the backup configuration 328, "51 to 80" PFs can be appropriately operated. In other words, FIG. 7 shows that, in order to appropriately operate the PaaS 12 capable of providing "51 to 80" PFs, the PaaS 12 must be operated with the "PaaS operation A" as the HA configuration 324, the "PaaS operation A" as the monitoring configuration 326, and the "PaaS operation B" as the backup configuration 328.

FIG. 8 shows an example of the operation option information 330 of PaaS.

The operation option information 330 of PaaS includes contents of a configuration of each PaaS operation 334. The contents of the configuration of a PaaS operation may include an operation type 332 and a configuration value of the operation type 332. As described above, examples of the operation type 332 may include an HA configuration, a monitoring configuration, and a backup configuration.

The HA configuration represents a configuration regarding whether or not the PF 22 is to be operated in an HA mode. When the HA configuration is "enabled", the PF 22 is operated in the HA mode, but when the HA configuration is "disabled", the PF 22 is not operated in the HA mode. An operation in the HA mode requires that a larger number of nodes 32 than in a case of not operating in the HA mode be allocated to the PF 22.

The monitoring configuration represents a configuration of an interval at which the PF 22 is monitored. A monitoring target may be each node 32 realizing the PF 22. When the monitoring configuration is "5 minutes", the PF 22 may be monitored at intervals of approximately 5 minutes.

The backup configuration represents a configuration of an interval at which the PF 22 is backed up. A backup target may be each node 32 realizing the PF 22. When the backup configuration is "every day", data on the PF 22 may be backed up every day.

For example, FIG. 8 shows that the "PaaS operation B" configures the HA mode to "enabled", the monitoring interval to "5 minutes", and the backup interval to "every day". A similar description also applies to the "PaaS operation A" and a "PaaS operation C". Therefore, FIGS. 7 and 8 show that, in order to appropriately operate "81 to 200" PFs, the HA mode must be configured to "enabled", the monitoring interval must be configured to "5 minutes", and the backup interval must be configured to "every day".

In a prescribed section of a resource amount, a range of the resource amount included in operation information may be smaller than a range of the resource amount included in configuration information. For example, with respect to a prescribed section of "0 to 200" PFs, in the case of the configuration information 220 of PaaS shown in FIG. 3, two ranges "0 to 100" and "101 to 200" are included in the prescribed section. In contrast, in the case of the operation information 320 of PaaS shown in FIG. 7, three ranges "0 to 50", "51 to 80", and "81 to 200" are included in the prescribed section. In other words, the sections of the operation information 320 are divided finer than the sections of the configuration information 220. Accordingly, an operation system can be changed preemptively (with sufficient time) relative to changing a node configuration with respect to an increase in a resource amount (for example, the number of PFs). Therefore, reliability of a node configuration change process which may be subsequently executed increases.

FIG. 9 is a flow chart showing an example of a configuration change process.

The monitoring program 52 acquires a required resource amount from XaaS of a certain tier (S100). As described earlier, the required resource amount includes a resource amount required for the XaaS. For example, a required resource amount issued from the SaaS 10 includes a content of "requesting addition of "50" PFs". For example, a required resource amount issued from the PaaS 12 includes a content of "requesting addition of "2" VMs".

The resource determination program 54 performs S102 to S108 described below with respect to XaaS on a next level below the XaaS that is the issuing source of the required resource amount (S102). In the description of FIGS. 9 to 11, the XaaS on the next level below will be referred to as a "target XaaS".

The resource determination program 54 determines whether or not a current node configuration of the target XaaS enables providing a resource amount requested by the XaaS on the next level above the target XaaS (S104). When a result of the determination is positive (YES in S104), the resource determination program 54 exits the loop of S102 to S108 and advances to S110. This is because there is no need to change the node configuration of the target XaaS.

When the result of the determination in S103 is negative (NO in S104), the resource determination program 54 executes a configuration determination process (S106). In the configuration determination process, the resource determination program 54 determines a node configuration of the target XaaS (in other words, a changed node configuration) which enables providing the resource amount requested by the higher level XaaS, and generates configuration change information including contents of the changed node configuration. Details of the configuration determination process will be described later (refer to FIGS. 10 and 11).

In addition, the resource determination program 54 returns to the process of S102 with the target XaaS with the changed node configuration as higher level XaaS (S108). In other words, the resource determination program 54 executes the processes of S102 and thereafter with XaaS on a next level below the XaaS with the changed node configuration (the higher level XaaS) as target XaaS. Accordingly, the processes of S102 to S108 are repeated until there exists XaaS of a tier which yields a positive result of the determination of S104 or until XaaS on a lowermost tier is reached.

After a changed node configuration of XaaS of each tier is determined, the resource control program 56 executes the next process (S110). Specifically, the resource control program 56 changes the node configuration of each XaaS based on the configuration change information generated in S106. At this point, the resource control program 56 changes node configurations in a sequence from lower level XaaS toward higher level XaaS. This is because, when node configurations are to be changed in a sequence from the higher level XaaS toward the lower level XaaS, a resource amount may run short at the higher level XaaS.

FIG. 10 is a flow chart showing an example of a configuration determination process. This process represents details of S106 in FIG. 9.

Based on the configuration information 200, the resource determination program 54 determines a node configuration of the target XaaS which enables providing a resource amount requested by the higher level XaaS (S200).

For example, let us assume that the number of PFs 22 which can be currently provided by the PaaS 12 is "80". Since the "80" PFs 22 belong to the "0 to 100" range of the number of PFs 222 in the configuration information 220 of PaaS shown in FIG. 3, a current node configuration of the PaaS 12 is the "PaaS configuration A". When a required resource amount to the effect of "requesting addition of "50" PFs" is issued from the SaaS 10, the PaaS 12 must be capable of providing a total of "130 (=80+50)" PFs 22. In the PaaS configuration information 220 shown in FIG. 3, "130" PFs belong to the "101 to 200" range of the number of PFs 222. Therefore, the resource determination program 54 determines that there is a need to change the node configuration of the PaaS 12 to the "PaaS configuration B". In addition, based on the configuration option information 230 of PaaS shown in FIG. 4, the resource determination program 54 calculates the number of nodes to be increased when the "PaaS configuration A" is changed to the "PaaS configuration B". Furthermore, the resource determination program 54 calculates the number of VMs of the IaaS 14 necessary to increase the calculated number of nodes. The calculated number of VMs becomes a "resource amount requested by higher level XaaS" in a next loop (S102 to S108) in FIG. 9.

Next, based on the operation information 300, the resource determination program 54 determines an appropriate operation system for the changed node configuration determined in S200 (S202).

For example, in a similar manner as described above, let us assume that the number of PFs 22 which can be currently provided by the PaaS 12 is "80". Since the "80" PFs 22 belong to the "51 to 80" range of the number of PFs 322 in the operation information 320 of PaaS shown in FIG. 7, the PaaS 12 is currently operated with the "PaaS operation A" as the HA configuration 324, the "PaaS operation A" as the monitoring configuration 326, and the "PaaS operation B" as the backup configuration 328. In addition, in a similar manner as described above, let us assume that a required resource amount to the effect of "requesting addition of "50" PFs" is issued from the SaaS 10. In the PaaS operation information 320 shown in FIG. 7, "130" PFs belong to the "81 to 200" range of the number of PFs 322. Therefore, the resource determination program 54 determines that there is a need to change the operation system the PaaS 12 such that the HA configuration is changed to the "PaaS operation B", the monitoring configuration is changed to the "PaaS operation B", and the backup configuration is changed to the "PaaS operation C".

Next, when a constraint is created due to the change (in other words, the determinations in S200 and S202) in the configuration or the operation of the target XaaS, the resource determination program 54 generates constraint information including contents of the constraint (S204). The constraint information may be used when a node configuration of lower level XaaS of the target XaaS is determined. For example, when constraint information with respect to the target XaaS exists, in the process of S200 or S202 described above, a node configuration and/or an operation system must be determined in accordance with contents of the constraint.

For example, when the HA configuration of the PaaS 12 is changed from "disabled" to "enabled", the changed PaaS 12 must be operated in the HA mode. In the HA mode, the nodes 32 of the PaaS 12 must be constructed on different VMs 24. The constraint generated in this case may include contents to the effect that "PaaS nodes 32 are to be constructed on different VMs 24".

Next, the resource determination program 54 generates configuration change information of the target XaaS based on contents determined in S200 to S204 (S206). In S110 shown in FIG. 9, the node configuration and the operation system of the target XaaS are changed based on the configuration change information of the target XaaS generated at this point.

FIG. 11 is a flow chart showing a modification of a configuration determination process. The processes shown in FIG. 11 represent a modification of the processes shown in FIG. 10. In the processes shown in FIG. 11, the following process has been added between the processes of S200 and S202 shown in FIG. 10. Therefore, processes similar to those of FIG. 10 will be denoted by similar reference signs and a description thereof will be omitted.

The resource determination program 54 determines whether or not a resource amount required for higher level XaaS (in other words, a resource amount that must be provided by target XaaS) exceeds an upper limit of a resource amount (for example, the number of PFs 222 or the number of VMs 242) defined in the configuration information 200 (S302). When a result of the determination in S302 is "YES", the resource determination program 54 proceeds to S304. On the other hand, when the result of the determination in S302 is "NO", the resource determination program 54 proceeds to S202. Processes of S202 and thereafter are similar to FIG. 10 and will not be described.

Next, a case where the result of the determination in S302 is "YES" will be described. The resource determination program 54 calculates a resource amount exceeding an upper limit of a resource amount defined in the configuration information 200. In addition, the resource determination program 54 selects a node configuration associated with the upper limit of the resource amount and a node configuration associated with the resource amount exceeding the upper limit from the configuration information 200 (S304). Furthermore, the resource determination program 54 performs processes of S202 and thereafter for each of the two selected node configurations.

For example, let us assume that, in the configuration information 220 of PaaS in FIG. 3, an upper limit range of the number of PFs 222 is "201 to 300". This upper limit may be defined by a manager of the PaaS 12 or the like. When the number of PFs which should be providable by the PaaS 12 is "320 (>300)" (in other words, when the result of the determination in S302 is YES), the resource determination program 54 performs the following process. Specifically, the resource determination program 54 determines the "PaaS configuration C" corresponding to the upper limit "300" of the number of PFs and the "PaaS configuration A" corresponding to the "20" excess PFs in the configuration information 220. In addition, in S204, the resource determination program 54 generates configuration change information including a set of the "PaaS configuration C" and the "PaaS configuration A".

Moreover, the resource determination program 54 may create a set of the "PaaS configuration B" corresponding to the number of PFs "200" and the "PaaS configuration B" corresponding to the number of remaining PFs 22 "120" in the configuration information 220. Alternatively, the resource determination program 54 may equally divide a resource amount which must be provided by the target XaaS and may create a set of configurations corresponding to respective divisions of the resource amount in the configuration information.

According to the processes shown in FIG. 11, even when a verified node configuration corresponding to a required resource amount does not exist in the configuration information 200, a node configuration of XaaS can be changed with a combination of a plurality of verified node configurations. Accordingly, since the XaaS is changed with node configurations which are all verified, reliability of the XaaS is improved.

The embodiment of the present invention described above merely represents an example for illustrating the present invention, and it is to be understood that the scope of the present invention is not limited to the embodiment. It will be obvious to those skilled in the art that the present invention can be implemented in various other modes without departing from the spirit of the present invention. For example, expressions such as "cloud computing" and "XaaS" in the embodiment are merely examples and the present invention can be applied to IT systems constituted by computer resources.

In the embodiment described above, "resources" are limited to the three types of VM, PF, and AP and "resource amounts" are limited to the number of VMs, the number of PFs, and the number of APs in order to facilitate understanding. However, in the present invention, both "resources" and "resource amounts" need not be limited to the embodiment described above. For example, a "resource" may be a node that forms a basis of any of a VM, a PF, and an AP or a logical or physical component that constitutes or provides a node. In addition, a "resource amount" may be the number, a capacity, or the like of a node or the number, a capacity, or the like of the component described above.

REFERENCE SIGNS LIST

2 Management computer
6 Computer system
10 SaaS
12 PaaS
14 IaaS

The invention claimed is:

1. A management computer, comprising:
an interface device coupled to a computer system; and
a processor configured to manage a plurality of XaaS (X as a Service) which are based on the computer system and which include first XaaS including first node configurations and second XaaS including second node configurations that are dependent on resources provided by the first XaaS, wherein
the processor is configured to,
when a required resource amount which is required for the first XaaS in order to change the second node configurations is larger than a resource amount which can be provided by the first XaaS, determine a changed first node configuration which enables providing a resource amount equal to or larger than the required resource amount and,
after changing the first XaaS to the determined changed first node configuration, change the second node configurations of the second XaaS.

2. The management computer according to claim 1, further comprising first configuration information in which a resource amount provided by the first XaaS is associated with first node configurations which enable providing the resource amount, wherein
the processor is configured to determine a first node configuration which enables providing a resource amount equal to or larger than the required resource amount, based on the first configuration information.

3. The management computer according to claim 2, wherein the node configurations include the number of nodes for each type of node,
the resource amount is an amount of resources provided in accordance with the number of at least one type of node, and
all node configurations included in the configuration information have been verified to be capable of enabling providing a resource amount associated with the respective node configurations.

4. The management computer according to claim 3, wherein the processor is configured to, when the required resource amount is larger than a maximum resource amount included in the configuration information, divide the required resource amount so that each division is equal to or smaller than the maximum resource amount, and determine a node configuration which enables providing a resource amount that is equal to or larger than the divided required resource amount, based on the configuration information for each of the divided required resource amount.

5. The management computer according to claim 2, further comprising first operation information in which a resource amount provided by the first XaaS is associated with first XaaS operation systems which enable providing the resource amount, wherein
the processor is configured to
determine a first XaaS operation system which enables providing a resource amount equal to or larger than the required resource amount, based on the first operation system, and
change the first XaaS to the determined operation system.

6. The management computer according to claim 5, wherein the node configurations include the number of nodes,
the resource amount is an amount of resources provided in accordance with the number of nodes,
all node configurations included in the configuration information have been verified to be capable of enabling providing a resource amount associated with the respective node configurations, and
all operation systems included in the operation information have been verified to be capable of enabling operating a resource amount associated with the respective operation systems.

7. The management computer according to claim 1, further comprising first operation information in which a resource amount provided by the first XaaS is associated with first XaaS operation systems which enable providing the resource amount, wherein
the processor is configured to
determine a first XaaS operation system which enables providing a resource amount equal to or larger than the required resource amount, based on the first operation system, and
change the first XaaS to the determined operation system.

8. The management computer according to claim 7, wherein the node configurations include the number of nodes for each type of node,
the resource amount is an amount of resources provided in accordance with the number of at least one type of node, and
all operation systems included in the operation information have been verified to be capable of enabling operating a resource amount associated with the respective operation systems.

9. The management computer according to claim 1, wherein a resource provided by the first XaaS is a virtual machine, a resource amount of the first XaaS is an amount based on the number of the virtual machines, the second node is constructed on the virtual machine, a resource provided by the second XaaS is a platform for developing or executing an application, and a resource amount of the second XaaS is an amount based on the number of the platforms.

10. The management computer according to claim 9, further comprising second operation information in which a resource amount provided by the second XaaS is associated with second XaaS operation systems which enable providing the resource amount, wherein
in the second operation information, a prescribed resource amount or more is associated with an operation system according to which the platform is operated in an HA (High Availability) mode, and
a required resource amount when operating the second XaaS in the HA mode is larger than a required resource amount when the second XaaS is not operated in the HA mode.

11. The management computer according to claim 1, further comprising:
configuration information in which a range of a resource amount is associated with a node configuration which enables providing a resource amount within the range; and
operation information in which a range of a resource amount is associated with an XaaS operation system which enables providing a resource amount within the range, wherein
in a prescribed section of a resource amount, the range of the resource amount included in the operation information is smaller than the range of the resource amount included in the configuration information.

12. A computer system management method of managing a plurality of XaaS (X as a Service) which are based on a computer system and which include first XaaS including first node configurations and second XaaS including second node configurations that are dependent on resources provided by the first XaaS, the method comprising:
determining whether or not a required resource amount which is required for the first XaaS in order to change the second node configurations is larger than a resource amount which can be provided by the first XaaS;
when a result of the determination is positive, determining a changed first node configuration which enables providing a resource amount equal to or larger than the required resource amount;
changing the first XaaS to the determined changed first node configuration; and
after the change, changing the second node configurations of the second XaaS.

\* \* \* \* \*